(12) United States Patent
Hashman (10) Patent No.: US 6,398,250 B1
(45) Date of Patent: Jun. 4, 2002

(54) TRAILER HITCH

(76) Inventor: James Hashman, P.O. Box 874542, Wasilla, AK (US) 99687

( * ) Notice: Subject to any disclaimer, the term of this patent is extended or adjusted under 35 U.S.C. 154(b) by 0 days.

(21) Appl. No.: 09/773,719

(22) Filed: Jan. 30, 2001

(51) Int. Cl.[7] .............................................. B62D 53/06
(52) U.S. Cl. ................ 280/438.1; 280/433; 280/407.1; 280/441.2; 280/901
(58) Field of Search .................... 280/901, 638, 280/656, 407, 407.1, 423.1, 425.1, 425.3, 438.1, 441.2, 482, 492, 494, 491.2, 504, 450, 433

(56) References Cited

U.S. PATENT DOCUMENTS

| | | | | |
|---|---|---|---|---|
| 3,897,086 A | * | 7/1975 | Breford | 280/438.1 |
| 3,899,194 A | * | 8/1975 | Breford | 280/438.1 |
| 4,256,323 A | * | 3/1981 | McBride | 280/423.1 |
| 4,832,358 A | * | 5/1989 | Bull | 280/418.1 |
| 5,785,341 A | * | 7/1998 | Fenton | 280/441 |
| 5,890,728 A | * | 4/1999 | Zilm | 280/433 |
| 5,947,503 A | * | 9/1999 | Tompkins | 280/455.1 |
| 6,186,530 B1 | * | 2/2001 | Zilm | 280/496 |

FOREIGN PATENT DOCUMENTS

WO 00/24606 * 5/2000

* cited by examiner

Primary Examiner—Brian L. Johnson
Assistant Examiner—Daniel Yeagley
(74) Attorney, Agent, or Firm—Michael J. Tavella (57) ABSTRACT

An extension coupling for releasably interconnecting a trailer to a fifth wheel tow hitch. This extension coupling includes a mount that is secured to the trailer, and an elongated arm that is pivotally secured to the mount and one end. A universal joint with lateral pins is attached to the other end of the arm to mate with the tow hitch. This allows the trailer to be displaced rearwardly of the tow hitch a distance equal to the length of the elongated arm while at the same time maintaining the loading point on a tractor vehicle forward of the rear axle. The assembly allows the trailer to pivot normally, without hitting the cab of short-bed pickup trucks. It also ensures that the weight of the trailer is carried forward of the rear axle for stability.

20 Claims, 14 Drawing Sheets

TRAILER HITCH

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to travel hitches and particularly to trailer hitches for fifth-wheel type trailers.

2. Description of Related Art

A fifth-wheel travel trailer is essentially a small, self-contained home that may be towed to a desired location by any suitable tractor vehicle, such as a pick-up truck. The forward portion of the travel trailer has a downwardly depending hitch box and downwardly projecting kingpin. This kingpin is sized and adapted to mate with a standard fifth-wheel hitch that is mounted on the tractor vehicle. Thus, the tractor vehicle supports the travel trailer so that its forward end is elevated above the surface of travel, such as a roadway, while the rear portion of the vehicle is supported on a wheel set so that it may travel over the surface.

The substantial weight of the fifth-wheel travel trailer requires proper loading and mounting of the hitch assembly. Where the typical pick-up truck is employed as the tractor vehicle, the fifth-wheel tow hitch receiver is secured in the bed of the pick-up truck above and slightly in front of the rear axle. It is important that the mounting not be located too far forward of the axle to avoid unnecessary bending moments about the axle. Moreover, it is important not to mount the hitch rearwardly of the axle otherwise the tractor vehicle will tend to rear off its front wheels resulting in loss of steering control.

Figure 1:
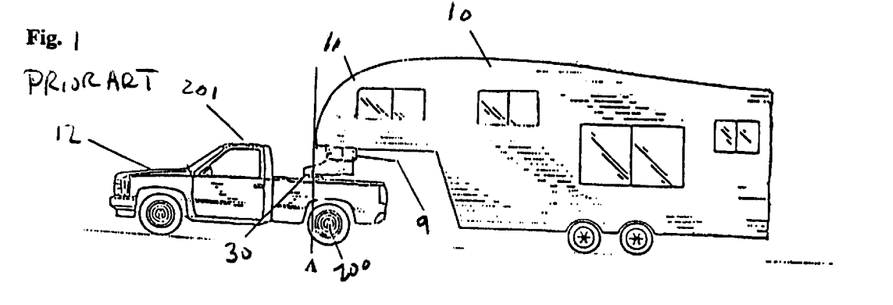
FIG. 1 is a side view in elevation of a fifth-wheel travel trailer being towed by a tractor vehicle having a short box bed according to prior art.
Figure 2:
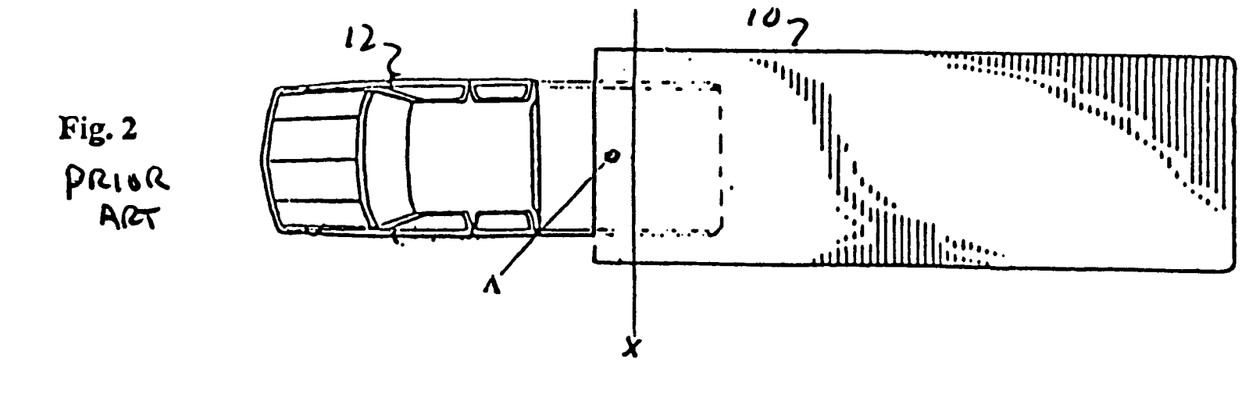
FIG. 2 is a top plan view of the prior art truck and trailer combination of the trailer being towed in a straight line.
Figure 3:
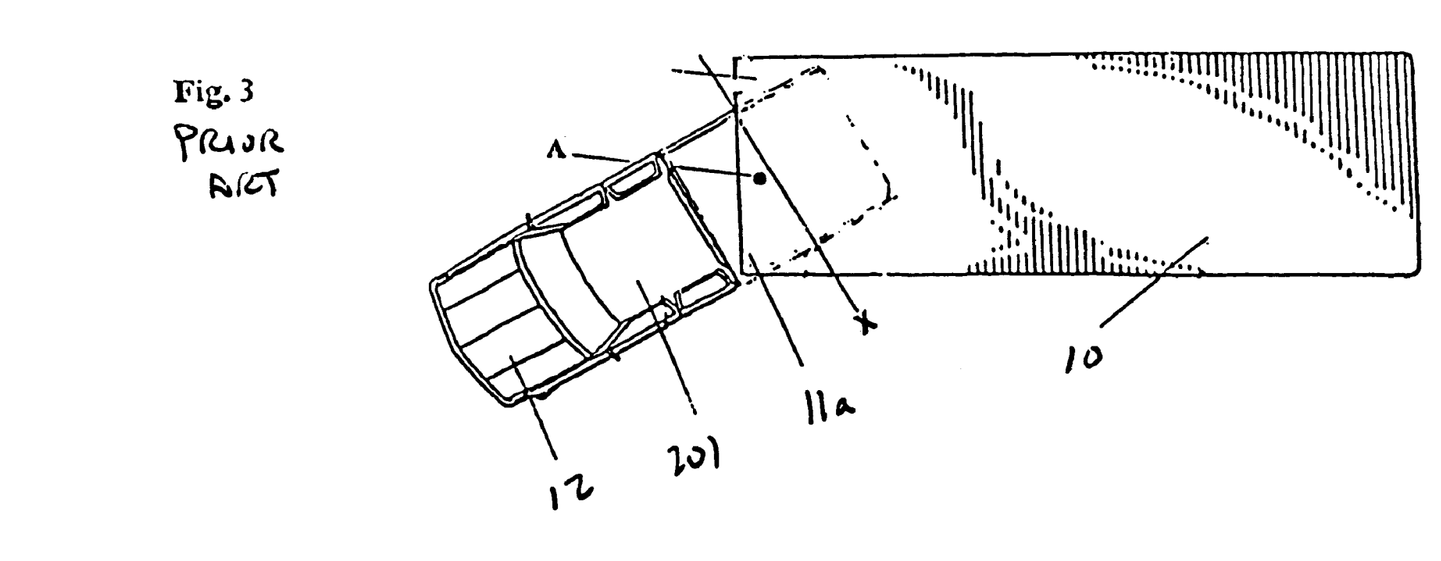
FIG. 3 is a top plan view of the prior art truck and trailer combination showing its reduced turning radius.

When a long-bed truck is employed as the tractor vehicle, relatively few difficulties are encountered in the proper mounting of a hitch receiver for a fifth-wheel trailer. Recently, though, the popularity of the short-bed pick-up truck has grown. These trucks typically have beds that are 6 to 7 feet in length. Consequently, there is a decreased distance between the rear axle of the pick-up truck and the cab. In such cases, as discussed more thoroughly below, the proper mounting of the hitch receiver results in inadequate clearance between the forward portion of the fifth-wheel trailer and the truck cab. FIGS. 1, 2 and 3, show a typical fifth-wheel trailer 10 attached truck 12, which is a short bed pick-up truck with a hitch 9. In order to keep the hitch receiver and axis A forward of the rear axle 200, as is represented by transverse axis X, a diminished space between the cab 201 of truck 12 and forward portion 11 of the trailer 10 is created. Towing trailer 10 in a straight line causes no problems. However, the turning radius of the combination of truck 12 and trailer 10 is diminished, as is shown in FIG. 3. As is shown in this figure, when the vehicle is making a turn, the corner 11a of forward portion 11 can contact cab 201 which can result in damage to truck 12, trailer 10 or both.

In order to achieve adequate clearance, the tow hitch may be moved rearwardly in the bed, behind the rear axle. However, as noted above, this creates an undesirable and potentially dangerous towing configuration.

Another undesirable situation occurs as the tractor and trailer encounter a series of dips or bumps in the road and the rear of the tractor vehicle and the front of the trailer start a pitching or bucking action as one dip in the road is encountered after another. This pitching action is not only bad for the components of the two vehicles; it is dangerous. Accordingly, a need has arisen for alternative mounting assemblies for fifth-wheel trailer vehicles.

BRIEF SUMMARY OF THE INVENTION

It is an object of the present invention to provide a hitch receiver, a hitch extension coupling and a shock absorbing bar to connect a tractor vehicle to a trailer, that allows the trailer to be towed by a short bed type vehicle.

A further object of the present invention is to provide a hitch coupling for a trailer that moves the pivot axis of the trailer rearwardly of the tractor vehicle while maintaining the load point of the trailer forward of the tractor vehicle's rear axles.

Another object of the present invention is to provide an extension coupling that allows the towing of a fifth-wheel travel trailer by a short bed pick-up truck in a safe manner.

Another object of the present invention is to provide a receiver, an extension coupling and a pitch absorber that allows a short bed pick-up truck to be used to tow a fifth-wheel trailer with diminished risk of damage to either during the towing operation.

Another object is to provide an appropriate hitch receiver for the hitch extension coupling.

Another object is to provide a pitch-absorbing bar to restrict extreme movement of the vehicles.

To accomplish these objects an extension coupling is provided that is adapted to releasably interconnect the trailer to a tow hitch that is located on the tractor vehicle. This extension coupling includes a mount that is adapted to be secured to the trailer, and an elongated arm that has a proximal end portion pivotally secured to the mount, and a distal end portion opposite the proximal end portion. A universal joint with lateral pins is attached to the distal end portion and is adapted to releasably mate with the tow hitch. This allows the trailer to be displaced rearwardly of the tow hitch a distance equal to the length of the elongated arm while at the same time maintaining the loading point on a tractor vehicle forward of the rear axle.

A mount is adapted to be secured to a hitch connecting station on the receiver that has a base plate and a pair of opposed side plates, which are oriented to be fastened to mounting plates that depend downwardly from the front of the trailer. Two cylinders extend down from the base plate of the inner cylinder. They are rigidly secured to the mount. The elongated arm includes a receiver adapted to rotatably receive the truck-mounted hitch. The arm may be structured as a housing, which includes a top wall, a bottom wall opposed to the top wall, and a surrounding sidewall. The arm may be telescoping to adjust the length of the arm.

A universal joint assembly is also provided with the hitch on the towed vehicle. The universal joint assembly engages the tow vehicle receiver when the trailer is attached and is used to resist rotation of the arm relative to the receiver on the tow vehicle. The fore and aft arms of the universal joint connect to the hitch assembly by means of sleeves, which allow the universal joint to pivot on an axis parallel to the tow vehicle. The tow arms perpendicular to the parallel arms seat in the hitch receiver create a perpendicular axis to the parallel axis.

Attached to the truck is a hitch receiver that is a box-like structure with the top and back end removed, The sides of the structure guide the hitch as the receiver is backed under the hitch. Inside the receiver is a pair of "U" shaped blocks machined to receive the vertical ends of the universal joint. The "U" shaped blocks receive the universal joint appendages as the fifth wheel hitch is lowered onto the hitch receiver. A pair of blocking plates on either side of the receiver swing in over the universal joint appendages securing the universal joint in the "U" shaped blocks. A rod passing through a slot in the locking plates moves the locking plates in or out of locking position. A spring-loaded plate engages the rod to secure it in the desired position.

An arm extends rearwardly from the extension coupling to engage the pitch dampener. A pitch dampener is used to reduce the pitching, or up and down bouncing movement, on the rear springs of the tractor vehicle when a series of depressions in the road are encountered.

These and other objects of the present invention will become more readily appreciated and understood from a consideration of the following detailed description of the exemplary embodiment when taken together with the accompanying drawings.

DETAILED DESCRIPTION OF THE INVENTION

Figure 4:
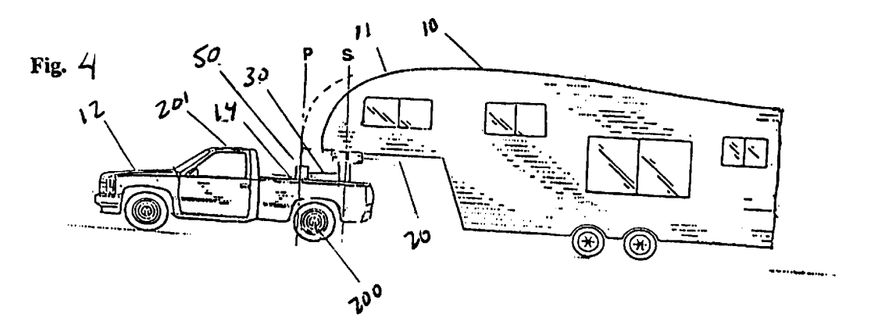
FIG. 4 is a side view in elevation showing the use of the extension coupling of the present invention with a truck and trailer combination.

FIG. 4 shows a fifth wheel trailer 10 that is adapted to be towed by a tractor vehicle, such as a short bed pick-up truck 12 so that it may be moved along a transport surface such as a roadway. In the preferred embodiment, hitch receiver 14 must be mounted as close to the rear axle of truck 12 as possible, to allow the weight of trailer 10 to be supported directly above the axle. It is desirable, though, that the hitch receiver 14 be mounted slightly forward of the rear axle, in order to reduce the possibility that truck 12 will "rear" onto its back tires with the front tires having diminished contact with the roadway or other support surface. The tendency of the vehicle to rear under heavy loads is substantially increased if hitch receiver 14 is mounted either directly above or rearwardly of the rear axle of truck 12. As shown in FIG. 4, an extension coupling 20 is used to interconnect the trailer 10 with the hitch receiver to maintain the load point of trailer 10 forwardly of the rear axle of the truck while at the same time keeping the trailer 10 a measured distance rearwardly of truck 12. Moreover, the present invention maintains the pivot axis for trailer 10 at the existing connector box attachment, all as described more thoroughly below.

Figure 5:
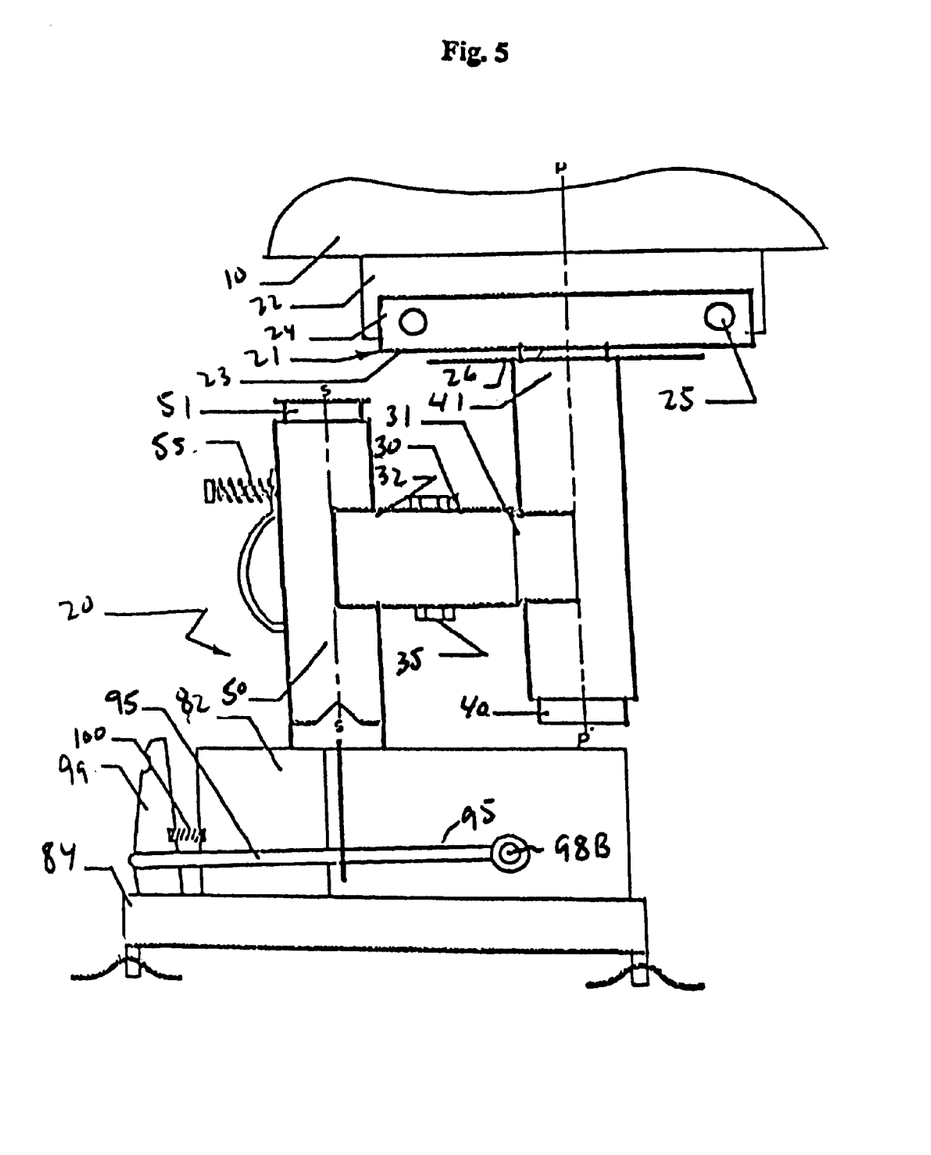
FIG. 5 is a side view of the extension-coupling hitch according to the present invention.
Figure 6:
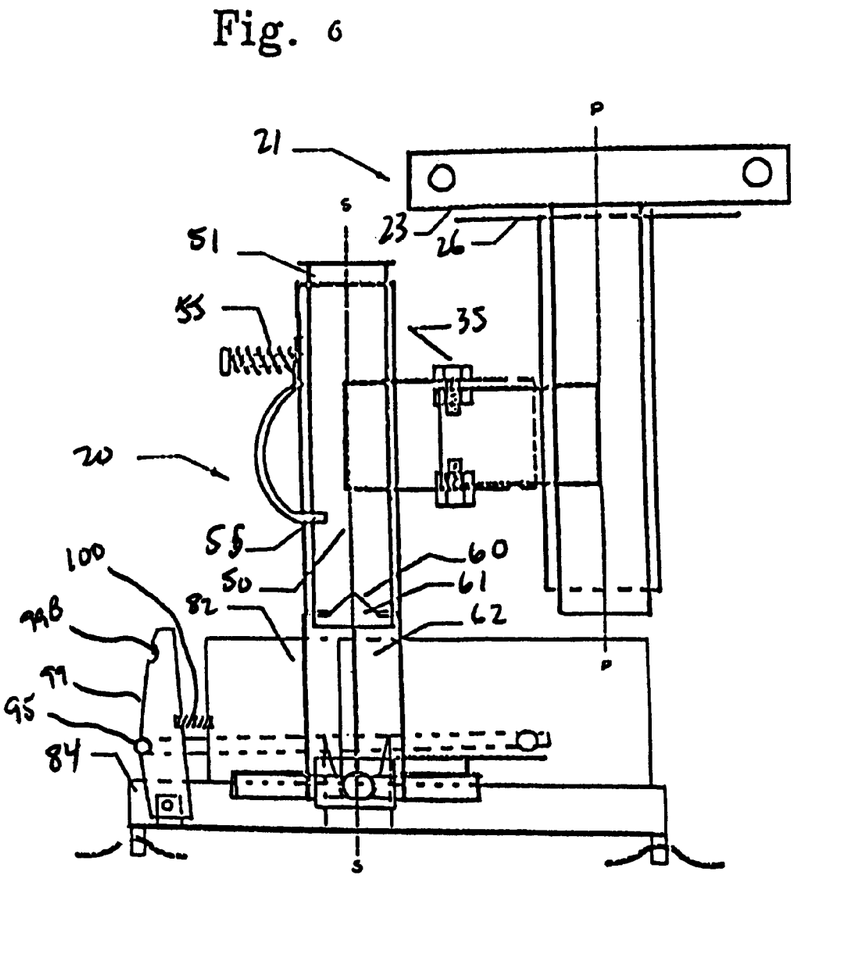
FIG. 6 is a side view in cross-section of the extension coupling hitch according to the present invention that is shown in FIG. 5.
Figure 7:
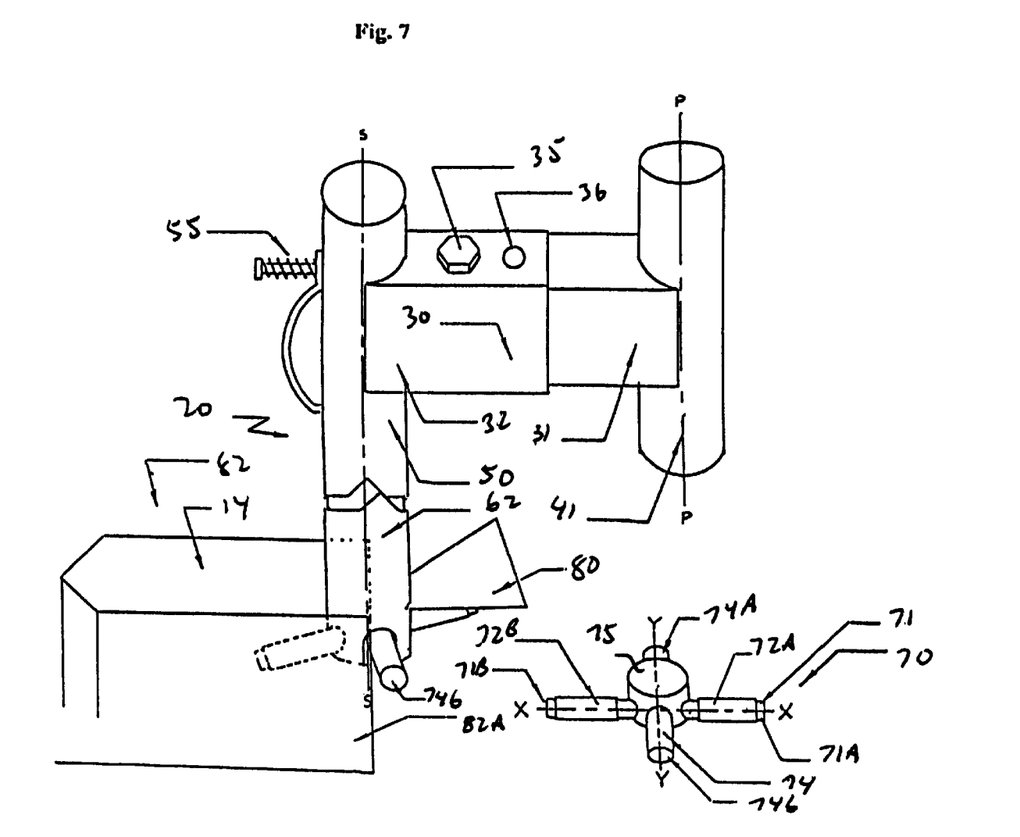
FIG. 7 is a perspective of the extension coupling including offset view of the universal joint.

FIGS. 5, 6 and 7 show that extension coupling 20 includes a mount 21 that is adapted to be secured to the trailer by mounting plates 22 which downwardly depend from the front portion 11 of the trailer 10. Mount 21 includes a base plate 23 from which a pair of opposed, parallel side plates 24 extends upwardly. Mounting holes 25 are formed in side plate 24 and are positioned to engage plates as shown. Mount 21 may be secured to plates 22 by means of nut and bolt sets in mounting holes 25.

FIG. 5 shows an elongated arm 30 that has a proximal end portion 31, which is secured to a cylinder 40. Cylinder 40 protrudes downward through cylinder 41 as shown. The rotation of cylinder 40 within cylinder 41 provides a pivot for axis P. Plate 23 and plate 26 provide a turntable for the pivoting on axis P. Plate 26 is attached to cylinder 41. Cylinder 40 is attached to base plate 23.

FIG. 7 shows distal end 32 secured to proximal end 31 by a bolt 35. The ends 31 and 32 are four-sided rectangular tubes. The end 31 is designed to be telescoping within end 32. The length of arm 30 can be adjusted by selecting one of the holes 36, through which bolts 35 can be placed.

FIG. 5 shows that distal end 32 of arm 30 is firmly attached to a cylinder 50 within which cylinder 51 passes through. The turning of cylinder 51 within cylinder 50 is the pivoting point for axis S.

Sectional view FIG. 6 shows the hitch on the towed vehicle and the receiver hitch on the tow vehicle mated together and ready for transport on the roadway. Pin 55 is shown in place. Pin 55 locks cylinder 50 to cylinder 51, thereby stopping the rotation on axis S.

Figure 9:
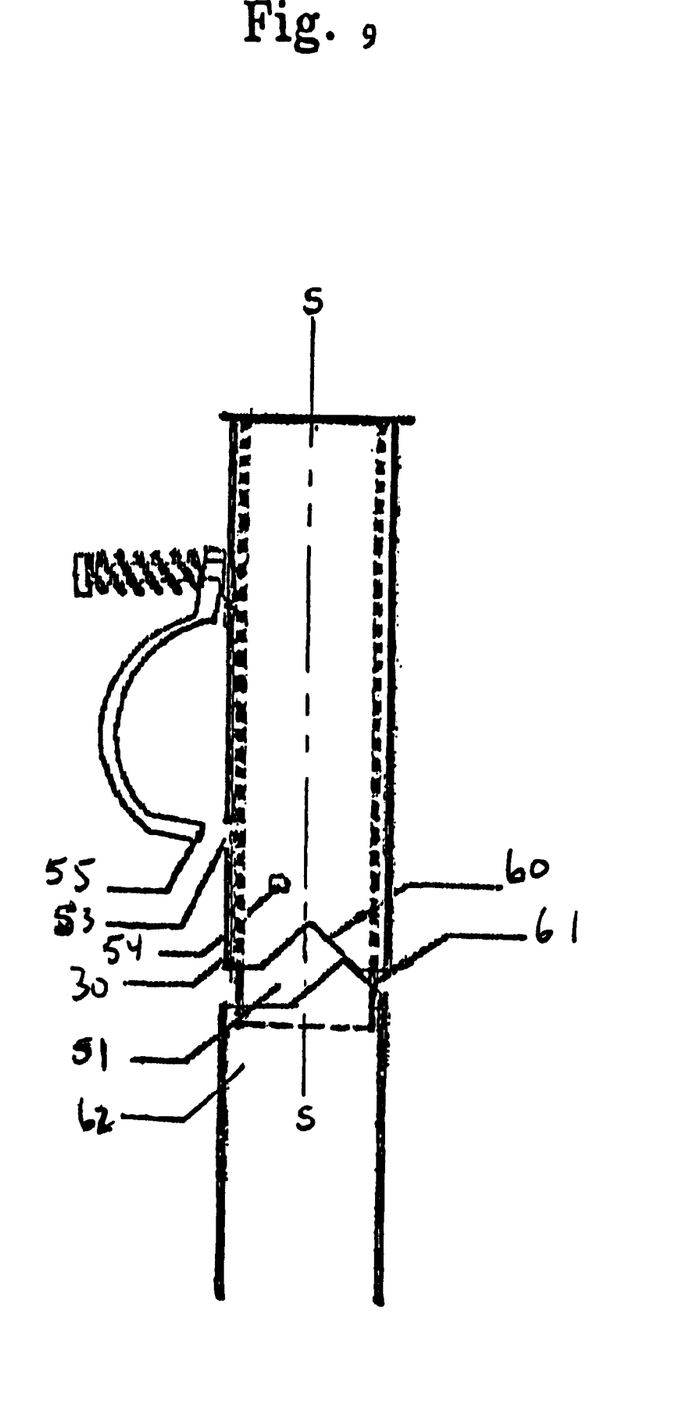
FIG. 9 is a partial side view in elevation showing parts in relationship to axis S.

FIG. 9 shows pin 55 removed from hole 53 in cylinder 50 and hole 54 in cylinder 51. Now, cylinder 50 and cylinder 51 are no longer locked together and cylinder 50 may pivot on cylinder 51. It must be noted that the amount of pivot on axis S for cylinder 51 and cylinder 50 is limited. Notched end 60 on cylinder 50 engages protruding end 61 on cylinder 62, which is firmly attached to cylinder 51. As cylinder 50 and cylinder 51 rotate on axis S, cylinder 50 is lifted up until cylinder 50 is pressed against the protruding end 61 of cylinder 62. As cylinder 50 presses against the protruding end 61 of cylinder 62, rotation between cylinder 50, cylinder 51 and cylinder 62 on axis S is terminated.

FIG. 7 shows a universal joint 70 having arm 71 with ends 71A and 71B. Perpendicular to arm 71 is arm 74, having two ends 74A and 74B. End 71A is inserted into 72A as end 71B is inserted into cylinder 72B. Cylinders 72A and 72B are attached to cylinder 75. Arm 71 is free to pivot within cylinder 72 on axis X. FIG. 7 also shows guide plate 80, which is attached to cylinder 75. Guide plates 82A and 82B are laterally attached to either side of the receiver hitch on the tow vehicle as shown. FIG. 7 also shows the receiver on the tow vehicle being backed under the towed vehicle hitch. If the hitch is not centered on the hitch receiver as the tow vehicle backs up, arm 74 on universal joint 70 engages either guide plate 82A or 82B on the hitch receiver. This contact then forces the arm 74 to become aligned automatically with the receiver.

In the hitching mode, cylinder 75 and the universal joint 70, attached to cylinder 75, are free to pivot on axis S to a limited degree. Should the hitch be off center of the receiver as the receiver is backed under the hitch, and arm 74 engages guide plate 82, the universal joint assembly pivots on axis S giving arm 74 a sufficient angle in relation to guide plate 82 to slide to the center of the receiver. As the receiver advances, the hitch plate 80 engages guide plate 82A or 82B on either the left or the right side of the hitch receiver to square up universal joint 70 with hitch receiver 14 on the tow vehicle. As the hitch receiver continues to move under the hitch, plate 80 engages guide 82A or 82B on either side of the hitch receiver to position arm 74 perpendicular to guide 82. As the tow vehicle and hitch receiver 14 continues toward the towed vehicle, the movement of the tow vehicle and the hitch receiver 14 are stopped as the leading arm 71 comes in contact with guide 82 of hitch receiver 14. The trailer is then in position to be lowered and the hitch to be attached to receiver 14.

Figure 8:
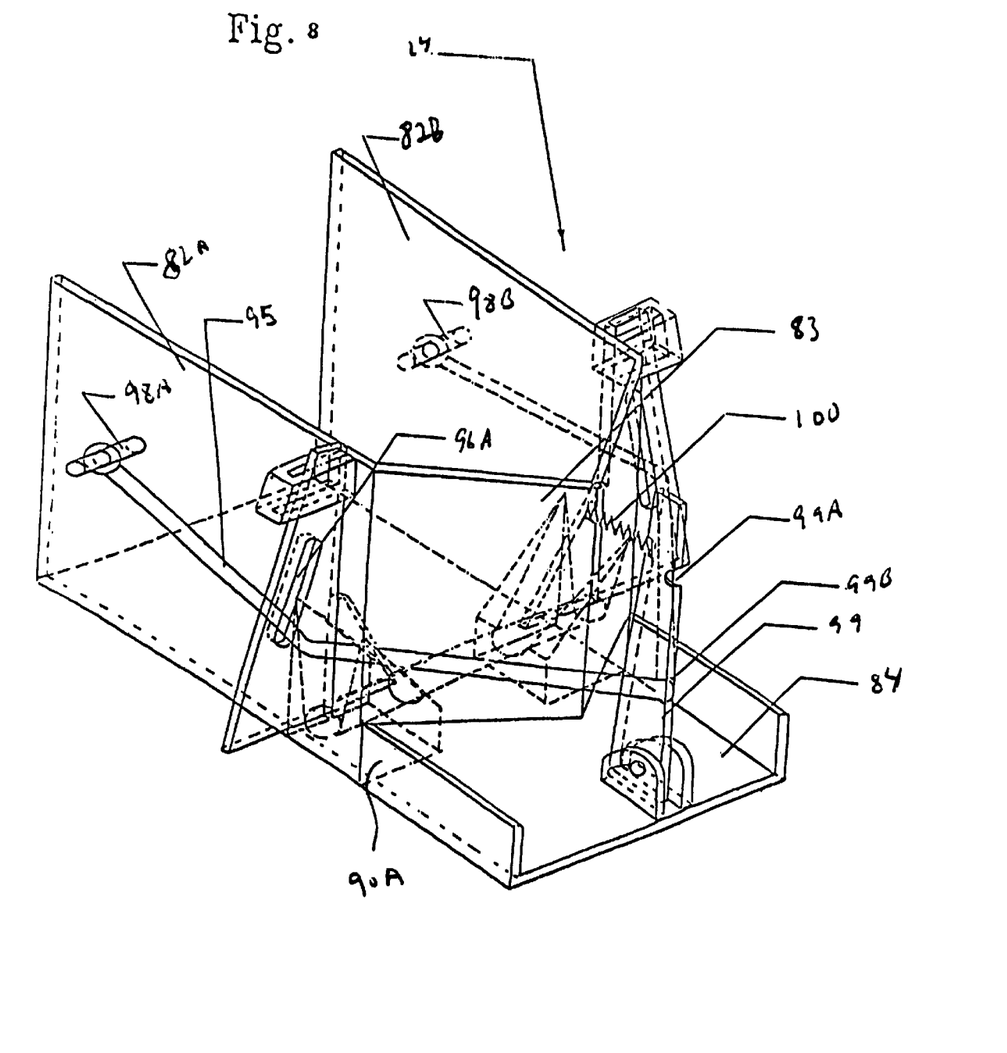
FIG. 8 is a perspective of the hitch receiver attached to the tow vehicle.
Figure 8A:
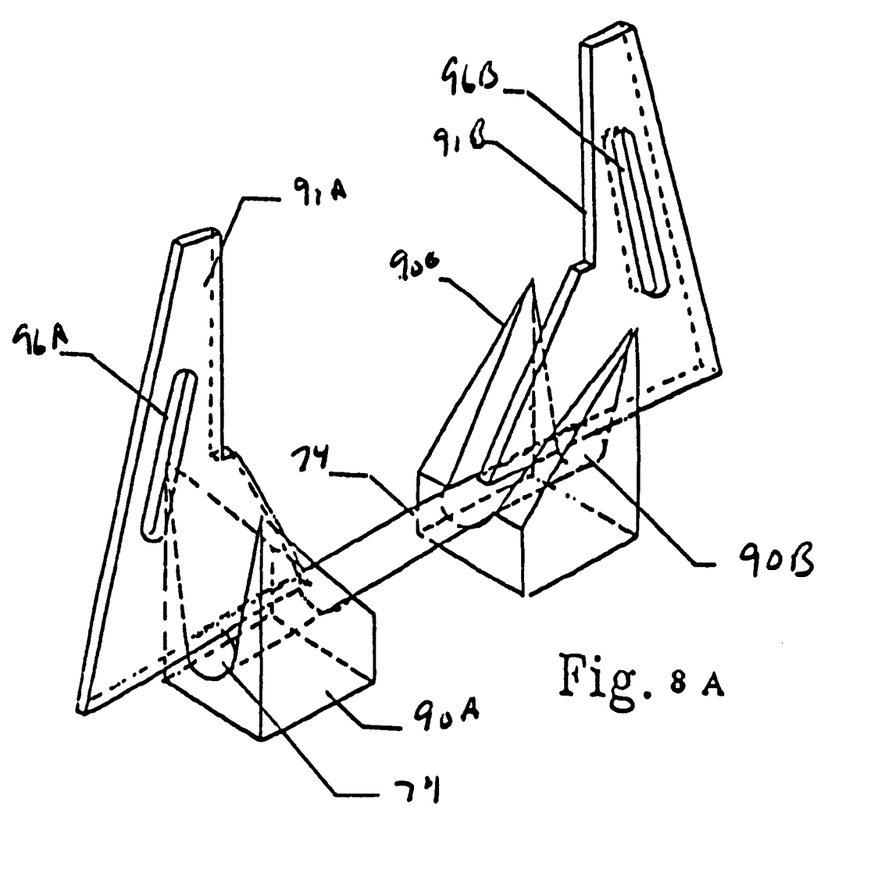
FIG. 8a is a detail view of the receiver blocks and the locking plates of the hitch receiver.

FIGS. 8 and 8a show hitch receiver 14 resembling a box having sides 82A, and 82B, a front 83 and a bottom 84. Attached to side 82A and bottom 84 is receiver block 90A. See FIG. 8a for details of the block. Attached to side 82B and bottom 84 is receiver block 90B. Receiver blocks 90A and 90B receive arms 74A and 74B of the hitch. Locking plates 91A and 91B are shown in a position where they lock hitch part 74A and 74B in the cradle of receiver blocks 90A and 90B.

A control rod 95 is shown extending through slots 96A and 96B, where it is attached to side 82A and 82B by pins 98A and 98B. Arm 99 is spring activated by spring 100 and has a lower notch 99B to restrict control rod 95 at the bottom of slots 96A and 96B. Plates 91A and 91B are in a locked position-securing arm 74. Arm 95 has an upper notch 99A that retains control rod 95 in the upper end of slot 96, which releases hitch part 74 by retracting locking plates 91A and 91B. See also FIGS. 5 and 10.

FIGS. 8 and 8a also show that in the hitching mode, control rod 95 will be in notch 99b of arm 99. Plate 91 is retracted to clear receiver blocks 90A and 90B to receive arms 74A and 74B of universal joint 70. Arm 74 of universal joint 70 is lowered into the recess of receiving blocks 90A and 90B. Control rod 95 is lowered to the bottom notch 99b of arm 99. Simultaneously control rod 95 moves downwardly in slots 96A and 96B. Locking plates 91A and 91B are then positioned inwardly over the upper portion of arms 74A and 74B of universal joint 70. Plates 91A and 91B are then in position to prevent any possibility of arms 74A and 74B from lifting away from blocks 90A and 90B.

Referring now again to FIG. 6, at this point the weight of the towed vehicle on notched end 60 of cylinder 50 and the protruding end 61 of cylinder 62, lines hitch 20 up with receiver hitch 14. Once these parts are aligned, pin 55 can be inserted, effectively eliminating pivoting on axis S.

FIG. 4, shows that, by using the extension coupling 20, the forward weight of trailer 10 is supported by tow hitch 14 forward of rear axle 200, while at the same time the extension arm 30 displaces the position of trailer 10 rearwardly. This allows a greater clearance between the truck cab 201 and front portion 11 of the trailer so that the turning angle between truck 12 and trailer 10 may be increased without risking damage to either trailer 10 or the truck cab 201. At the same time, trailer 10 may pivot during turning about spindle axis S in a standard manner since arm 30 does not pivot significantly with respect to tow vehicle 12.

Figure 10:
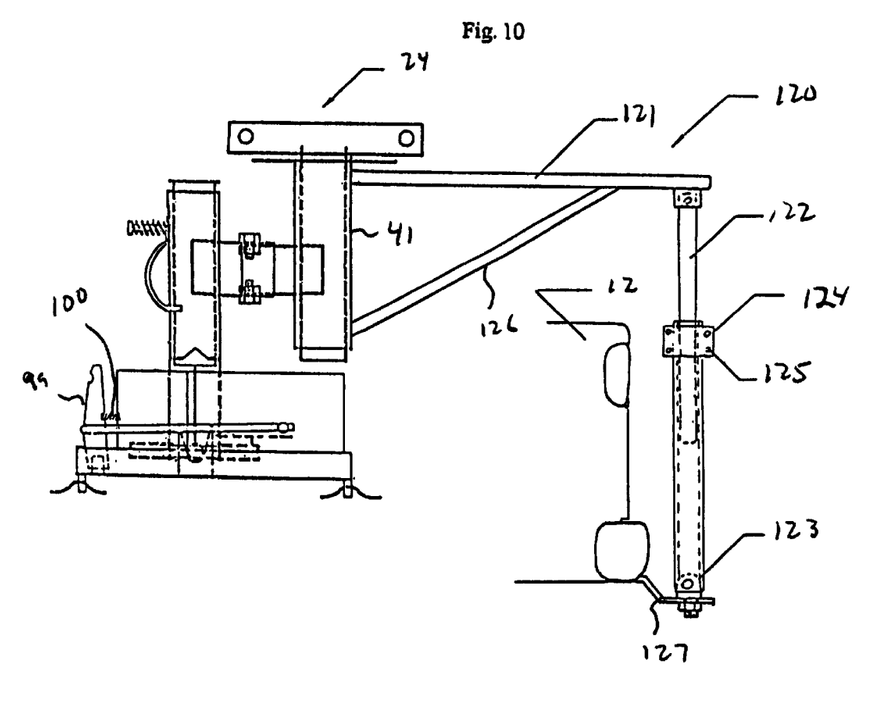
FIG. 10 is a side view in elevation of the present invention showing the pitch dampener bar installed on a vehicle.
Figure 11:
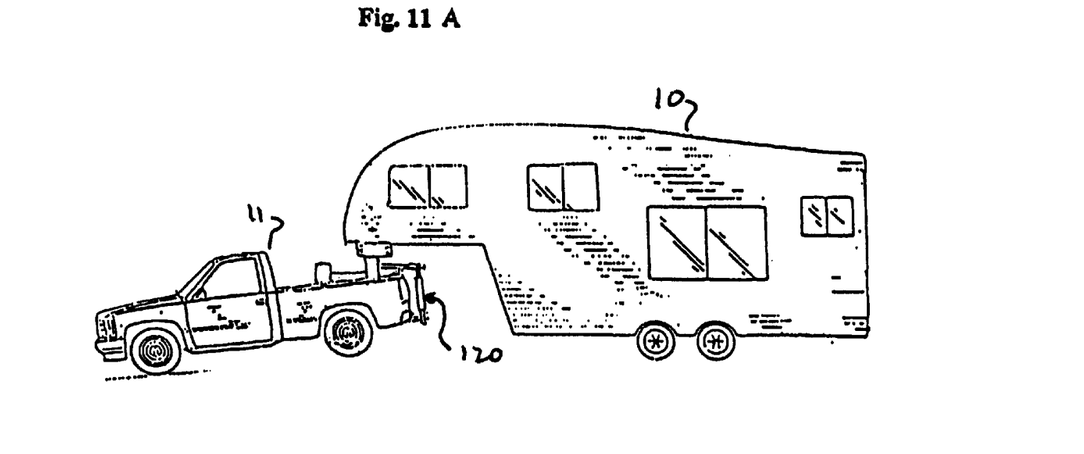
FIG. 11a is the side view of a trailer using the present invention with the pitch a damper bar installed showing the damper fully compressed.
FIG. 11b is the side view of a trailer using the present invention with the pitch damper bar installed showing the damper fully extended.

FIGS. 10, 11a and 11b show an optional resistance dampening system 120. FIG. 10 shows a side view of the system installed on a vehicle. As shown in FIG. 10, the system has an extension arm 121, which is attached to cylinder 41. Resistance arm 122 is pivotably attached to the end of the extension arm 121 as shown. The resistance arm 122 extends downward into a four-sided, generally rectangular receiver 123. The receiver 123 is attached to the vehicle 12 in a regular towing hitch 127. Resistance arm 122 is sized to fit within the receiver 123. A plate 124 is attached to the top of the receiver 123 as shown. The plate has two "U" bolts 125 attached to it to hold the extension arm 122 against plate 124. Resistance to movement is produced by arm 122 rubbing against plate 124. The resistance can be adjusted by tightening or loosening the bolts 125. Of course, more sophisticated dampers, such as shock absorbers or springs systems may be substituted for the resistance arm and tube assembly discussed above. In the preferred embodiment, the extension arm 121 is further supported by a brace 126 a that runs diagonally as shown as is also connected to cylinder 41.

FIG 11a shows the resistance arm 122 in a compressed mode as the trailer 10 and truck 12 hinge due to road conditions. FIG. 11b shows the resistance arm 122 in an expanded position. In both cases, the hinging action is resisted between the truck 122 and trailer 10 by the resistance arm. The resistance arm system 120 acts like a shock absorber when a bouncing effect occurs on the rear springs due to up and down road conditions.

Figure 12A:
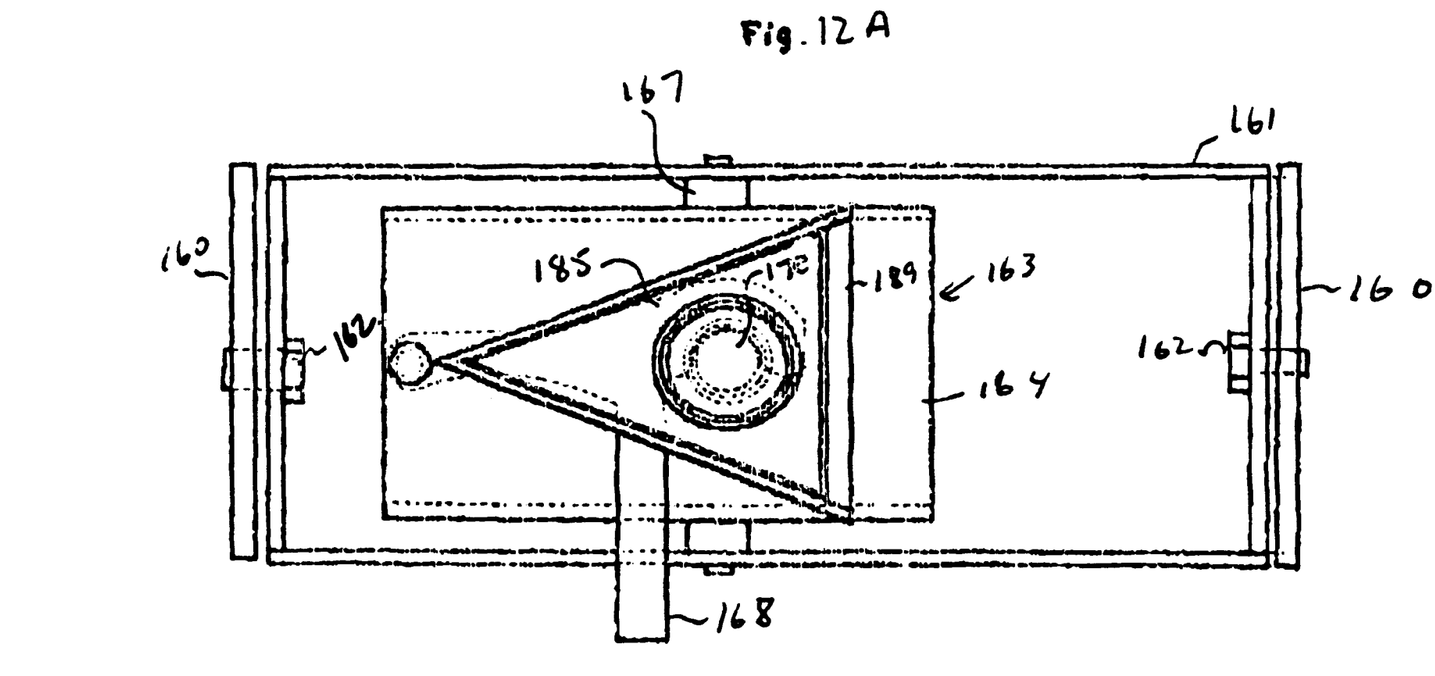
FIG. 12A shows a plan view of an alternate configuration of the U-joint shown in FIG. 7.
Figure 12B:
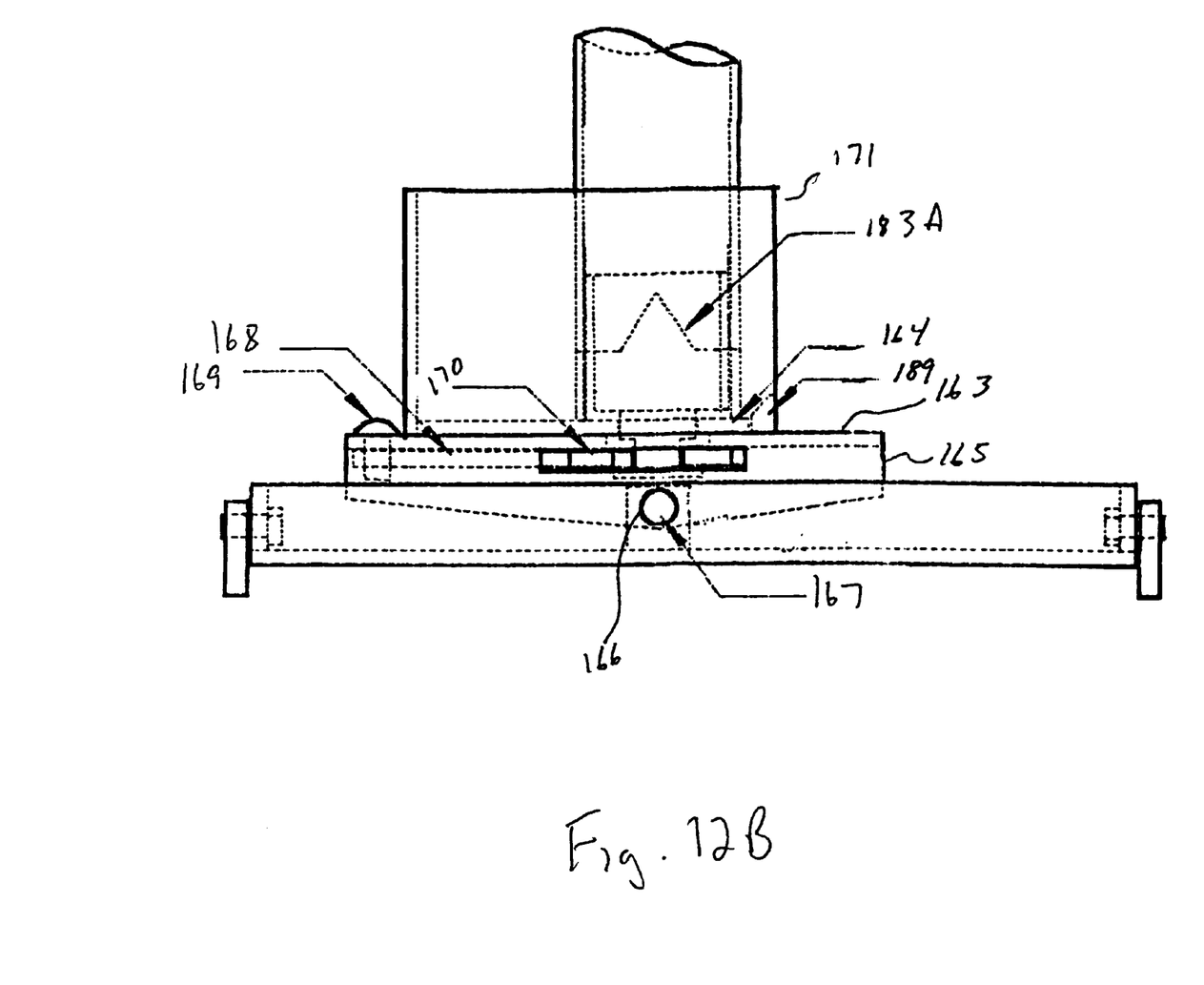
FIG. 12B is a side view of the alternate configuration of the U Joint of FIG. 12A mounted in the receiver.
Figure 13:
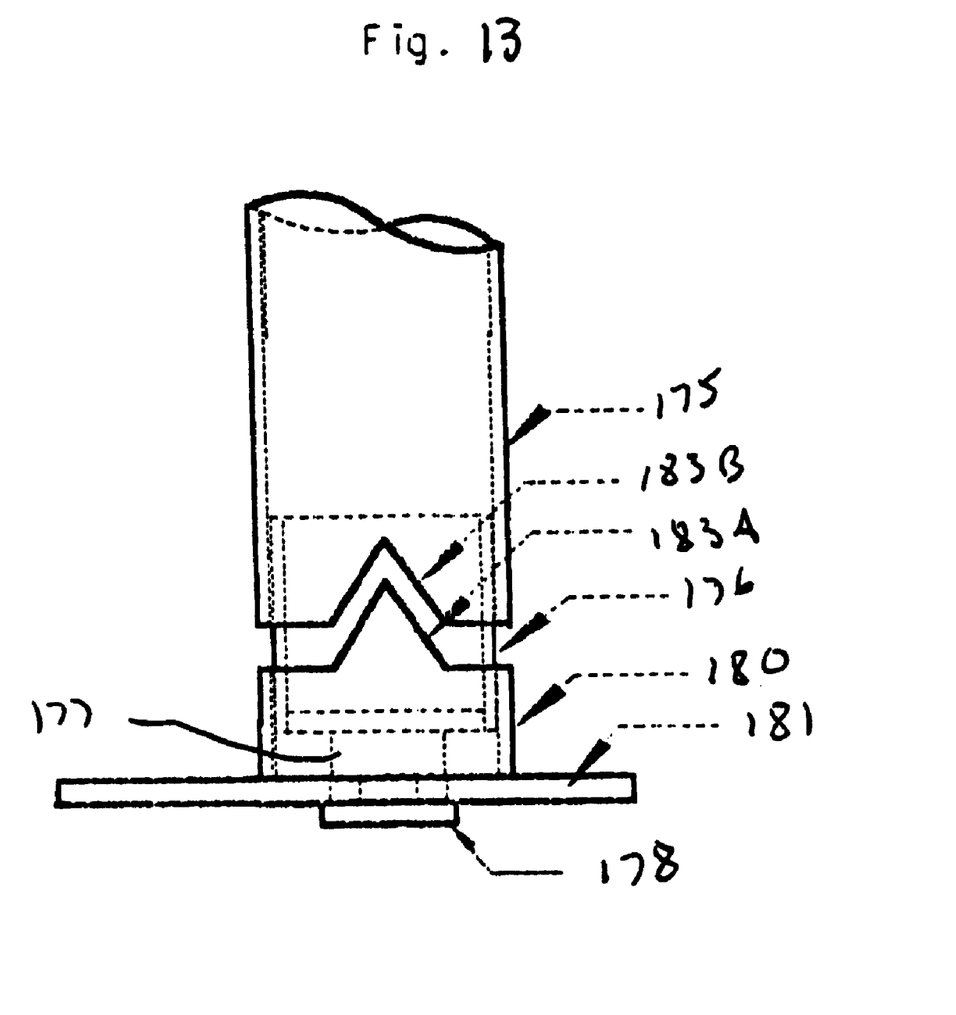
FIG. 13 is a detail view of the locking system for the alternate configuration of the U joint system.

Referring now to FIGS. 12A, 12B and 13, an alternate configuration of the U-joint found in FIG. 7 is shown. FIG. 12 A shows a plan view of this system. In this system, the universal joint of the previous embodiment is replaced by a pair of rocking platforms. This platform provides the same type of movement that the universal joint provides, using a simpler structure. The system has two brackets 160 that are secured to the bed of the vehicle 12. A lower box unit 161 is attached to the brackets 160 by a bolt system 162 that allows the box 161 to pivot about the bolt systems 162. The lower box unit 161 has four walls, but is open in the center. A hitch receiver platform 163 is positioned within the lower box unit 161. The hitch receiver platform 163 is an inverted box that has a top 164 and two side walls 165. The side walls have holes 166 for mounting a shaft 167. The shaft 167 is pivotably secured to the lower box unit as shown. This allows the hitch receiver platform 163 to pivot orthogonally to the pivoting motion of the lower box unit 161. As shown in FIGS. 12A and 12B, the hitch receiver platform has a latch arm 168 attached at a pivot point 169. A receiver keyway 170 is also formed in the top of the hitch receiver platform to receive the locking flange 178 from the hitch, as described below. Extending upward from the top of the hitch receiver platform 163 are two guide plates 171. As shown in FIG., 12A, the guide plates form a "V" shape.

The use of the double pivot points on these two assemblies replaces the universal joints used in the first embodiment.

In this embodiment, the lower portion of the hitch has been modified to accommodate the new system. FIG. 13 shows cylinder 175 extending down from the extension arm, (not shown in this view). Within cylinder 175 is cylinder 176, which is fixedly attached to cylinder 175. As shown in FIG. 13, cylinder 176 extends out of cylinder 175 for some distance. Cylinder 176 has a narrow neck 177 and a flange 178, which is used as a locking flange. Around the lower portion of cylinder 176 is cylinder 180, which is firmly attached to plate 181. Plate 181 is triangular and is designed to fit into the "V" shaped space formed by the guide plates 171. It has a rear lip 189 for strength. The cylinder 180 and plate 181 combination is designed to rest on locking flange 178. In this way, cylinder 180 and plate 181 are free to revolve around the neck 177 of cylinder 176. This provides another range of movement for the system that better allows the hitch plate 181 to align with the receiver and its guide plates during the hitching process.

To restrict the amount of movement of the hitch plate 181 and to lock the cylinder 180 to cylinder 175 for transport, ramps 183A and 183B are formed onto the cylinders as shown. When separated, the ramps allow cylinder 180 and plate 181 to pivot during the mating period. After the hitch is aligned in the receiver, the towed vehicle weight is lowered onto the hitch. As the hitch is lowered, ramps 183A and 183B come together. Once the ramps are together, plate 181 can no longer rotate.

The locking flange 178 is lowered through the keyway 170 in platform 163 and can be locked in place by activating latch arm 168 until the locking jaws 185 are secured around the locking flange 178. At this point, the trailer fully hitched. Once the leveling equipment has been removed, the trailer is ready to haul.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A trailer hitch for hitching a fifth-wheel type trailer, having an overhanging portion with an underside, to a vehicle having a short bed comprising:
   a) a first vertical post member, pivotably attached to the underside of said overhanging portion and extending downwardly therefrom;
   b) an extension arm member, having a distal end and a proximate end, the proximate end of said extension arm member being fixedly attached to said first vertical post member such that said extension arm member extends outwardly perpendicular thereto;
   c) a second vertical post member, being fixedly attached to the distal end of said extension arm member and extending downwardly therefrom;
   d) a hitch receiver, fixedly installed in the short bed of said vehicle;
   e) an inner post member, rotatably installed in said second vertical post member;
   f) a hitch flange, fixedly attached to said inner post member;
   g) a means for securing said hitch flange in said hitch receiver; and
   h) a means for securing said inner post member to said second vertical post member, removably attached to said second vertical post member, such that when said means for securing is attached, said inner post member is prevented from rotating.

2. The trailer hitch of claim 1 wherein the extension arm member is telescoping.

3. The trailer hitch of claim 1 further comprising a resistance leveling system.

4. The trailer hitch of claim 3 wherein the resistance leveling system comprises:
   a) a leveling arm having a proximate end and a distal end, the proximate end of said leveling arm fixedly attached to said first vertical post member and extending rearwardly therefrom; and
   b) a vertical dampening member having a top and a bottom, the top of said vertical dampening member being fixedly attached to the distal end of said leveling arm, and the bottom of said vertical dampening member being removably attached to said vehicle.

5. The trailer hitch of claim 1 wherein the means for securing said hitch flange in said hitch receiver includes a locking bar.

6. The trailer hitch of claim 1 wherein the hitch receiver includes a box having side walls extending upwards to align said hitch flange.

7. The trailer hitch of claim 1 wherein the inner post member includes a means for aligning said hitch flange with said hitch receiver.

8. The trailer hitch of claim 7 wherein the means for aligning said hitch flange with said hitch receiver includes a universal joint.

9. The trailer hitch of claim 7 wherein the means for securing said inner post member to said second vertical post member comprises a pin.

10. The trailer hitch of claim 1 wherein the means for securing said inner post member include:
    i) a male flange V member attached to said inner post member; and
    ii) a female flange V member formed in said second vertical post member, whereby when said male flange V member and female flange V member are aligned, said inner post member is locked in place and is prevented from rotating.

11. A trailer hitch for hitching a fifth-wheel type trailer, having an overhanging portion with an underside, to a vehicle having a short bed comprising:
    a) a first vertical post member, pivotably attached to the underside of said overhanging portion and extending downwardly therefrom;
    b) an extension arm member, having a distal end and a proximate end, the proximate end of said extension arm member being fixedly attached to said first vertical post member such that said extension arm member extends outwardly perpendicular thereto;
    c) a second vertical post member, being fixedly attached to the distal end of said extension arm member and extending downwardly therefrom;
    d) a hitch receiver, fixedly installed in the short bed of said vehicle, said hitch receiver having a pair of opposed side walls forming a guide chute;
    e) an inner post member, rotatably installed in said second vertical post member;
    f) a hitch flange, fixedly attached to said inner post member;
    g) a universal joint, operably attached to said inner post member and said hitch flange, to permit movement of said hitch flange with respect to said second vertical post member;

h) said hitch receiver further including a pair of holding flanges, adopted to receive said universal joint within said hitch receiver, and a locking bar, having two arms for securing said inner post member, whereby each of said two arms is positioned on one of said pair of holding flanges; and i) a means for securing said inner post member to said second vertical post member including a pin, pivotably attached to second vertical post member, wherein said inner post member having a hole therein to receive said pin, such that when said pin is placed in said hole, said inner post member is prevented from rotating.

12. The trailer hitch of claim 11 wherein the extension arm member is telescoping.

13. The trailer hitch of claim 11 further comprising a resistance leveling system.

14. The trailer hitch of claim 13 where in the resistance leveling system comprises:

a) a leveling arm having a proximate end and a distal end, the proximate end of said leveling arm fixedly attached to said first vertical post member and extending rearwardly therefrom; and b) a vertical dampening member having a top and a bottom, the top of said vertical dampening member being fixedly attached to the distal end of said leveling arm, and the bottom of said vertical dampening member being removably attached to said vehicle.

15. The trailer hitch of claim 11 wherein the means for securing said inner post member further includes: a male flange V member attached to said inner post member; and a female flange V member formed in said second vertical post member, whereby when said male flange V member and female flange V member are aligned, said inner post member is positioned in place for securing the hitch flange in said hitch receiver.

16. A trailer hitch for hitching a fifth-wheel type trailer, having an overhanging portion with an underside, to a vehicle having a short bed comprising:

a) a first vertical post member, pivotably attached to the underside of said overhanging portion and extending downwardly therefrom;

b) an extension arm member, having a distal end and a proximate end, the proximate end of said extension arm member being fixedly attached to said first vertical post member such that said extension arm member extends outwardly perpendicular thereto;

c) a second vertical post member, being fixedly attached to the distal end of said extension arm member and extending downwardly therefrom;

d) a hitch receiver, fixedly installed in the short bed of said vehicle, said hitch receiver having a first pivoting means for pivoting said hitch receiver in a first direction and a second pivoting means, orthogonal to said first pivoting means, for pivoting said hitch receiver in a second direction;

e) an inner post member, rotatably installed in said second vertical post member;

f) a hitch flange, fixedly attached to said inner post member;

g) a locking means for securing said inner post member to said second vertical post member to prevent said inner post member from rotating;

h) said hitch receiver further including a latch, pivotably attached to said hitch receiver, such that when said hitch flange is in a lockable position, said latch is pivoted above said hitch flange to lock said hitch flange in place.

17. The trailer hitch of claim 16 wherein the extension arm member is telescoping.

18. The trailer hitch of claim 16 further comprising a resistance leveling system.

19. The trailer hitch of claim 18 wherein the resistance leveling system comprises:

a) a leveling arm having a proximate end and a distal end, the proximate end of said leveling arm fixedly attached to said first vertical post member and extending rearwardly therefrom; and b) a vertical dampening member having a top and a bottom, the top of said vertical dampening member being fixedly attached to the distal end of said leveling arm, and the bottom of said vertical dampening member being removably attached to said vehicle.

20. The trailer hitch of claim 16 the locking means for securing said inner post member to said second vertical post member includes a male flange V member attached to said inner post member; and a female flange V member formed in said second vertical post member, whereby when said male flange V member and female flange V member are aligned, said inner post member is locked in place and is prevented from rotating.

* * * * *